United States Patent
Pal et al.

(10) Patent No.: US 7,873,727 B2
(45) Date of Patent: Jan. 18, 2011

(54) SYSTEM AND METHOD FOR EVALUATING STREAMING MULTIMEDIA QUALITY

(75) Inventors: Sourav Pal, Arlington, TX (US); Sumantra Kundu, Arlington, TX (US); Kalyan Basu, Arlington, TX (US); Sajal Das, Denton, TX (US)

(73) Assignee: Board of Regents, The University of Texas Systems, Austin, TX (US)

( * ) Notice: Subject to any disclaimer, the term of this patent is extended or adjusted under 35 U.S.C. 154(b) by 114 days.

(21) Appl. No.: 12/048,029

(22) Filed: Mar. 13, 2008

(65) Prior Publication Data

US 2009/0234940 A1  Sep. 17, 2009

(51) Int. Cl.
   G06F 13/00 (2006.01)
(52) U.S. Cl. .......... 709/224; 709/219; 709/231
(58) Field of Classification Search .......... 709/217, 709/219, 223, 224, 227, 228, 230, 231
See application file for complete search history.

(56) References Cited

U.S. PATENT DOCUMENTS 7,609,769 B2 * 10/2009 Mohandas .......... 375/240.26
2004/0156559 A1 * 8/2004 Cheng et al. .......... 382/286
2007/0237098 A1 * 10/2007 Wang .......... 370/256
2007/0263897 A1 * 11/2007 Ong et al. .......... 382/100
2008/0162714 A1 * 7/2008 Pettersson .......... 709/231
2009/0225670 A1 * 9/2009 Leung et al. .......... 370/252

* cited by examiner

Primary Examiner—Viet Vu
(74) Attorney, Agent, or Firm—Chowdhury & Georgakis, P.C.

(57) ABSTRACT

A system and computer program for evaluating in real-time streaming multimedia quality. The system including a multimedia server connected to a multimedia source and a remote client in communication with the multimedia server over a network. The multimedia server is configured to receive multimedia content from the multimedia source and to transmit the multimedia content as a multimedia stream. The multimedia stream includes a plurality of audio frames and a plurality of video frames. The remote client is configured to establish a multimedia session with the multimedia server, receive the multimedia stream via the multimedia session, monitor the media quality of the multimedia stream, and passively compute a subjective quality of the multimedia stream.

17 Claims, 12 Drawing Sheets

SYSTEM AND METHOD FOR EVALUATING STREAMING MULTIMEDIA QUALITY

STATEMENT REGARDING FEDERALLY SPONSORED RESEARCH

This invention was developed with U.S. Government support under Grant No. IIS-0326505 awarded by the National Science Foundation (NSF). The U.S. Government has certain rights in the invention.

BACKGROUND OF THE INVENTION

1. Field of the Invention

The present invention is generally related to streaming multimedia quality, and more particularly to a system and computer program for evaluating streaming multimedia quality.

2. Discussion of the Background

Evaluating the quality of streaming multimedia as perceived by remote clients over delay tolerant networks is crucial for understanding the time variant quality of service (QoS) the underlying communication network is able to support. For instance, such information can be used by the content delivery providers (CDPs) for deducing the subjective level of satisfaction the end user is able to derive. Traditionally, such monitoring has been carried out by observing the variations of network dynamics along the dimensions of packet loss, delay and jitter. However, packet loss does not necessarily translate into poor viewing quality because whether a multimedia frame is correctly decoded may depend on the error-concealment techniques defined under the respective multimedia standards (e.g., MPEG-2, MPEG-4, and H.264). For example, for the same packet loss, a H.264 decoder might be able to correctly recover a multimedia frame which would have been discarded by an MPEG-2 decoder. In addition, the same packet loss will result in different multimedia quality for the same decoding technique.

Existing video evaluation tools use the peak signal-to-noise ratio (PSNR) and the mean opinion scores (MOS) in quantifying multimedia quality. However, the metric of PSNR cannot be used for real-time monitoring of video quality because the original (reference) multimedia stream is not available. Additionally, PSNR calculated on YUV data is based on analyzing the mean squared error (MSE) between individual pixels of the original and received frame. It is thus extremely computationally intensive and is impractical for real-time monitoring of multimedia quality. Similarly, the MOS metric that is recommended by the International Telecommunications Union (ITU) cannot be used for real-time monitoring of video quality because it requires the ranking of each multimedia stream by a large pool of online watchers and normalizing individual feedback on a pre-established scale.

Thus, as noted above, there currently exists deficiencies in evaluating streaming multimedia quality in the prior art.

SUMMARY OF THE INVENTION

Accordingly, one aspect of the present invention is to provide a system for evaluating in real-time streaming multimedia quality. The system includes a multimedia server connected to a multimedia source, and a remote client in communication with the multimedia server over a network. The multimedia server is configured to receive multimedia content from the multimedia source and to transmit the multimedia content as a multimedia stream. The multimedia stream includes a plurality of audio frames and a plurality of video frames. The remote client is configured to establish a multimedia session with the multimedia server, receive the multimedia stream via the multimedia session, monitor the media quality of the multimedia stream, and passively compute a subjective quality of the multimedia stream.

Another aspect of the present invention is to provide a computer program product embodied on a computer readable medium for evaluating in real-time streaming multimedia quality. A multimedia server connected to a multimedia source is configured to receive multimedia content from the multimedia source and to transmit the multimedia content as a multimedia stream to a remote client over a network. The multimedia stream includes a plurality of audio frames and a plurality of video frames. The computer program product includes a first computer code for establishing a multimedia session with the multimedia server, a second computer code for receiving the multimedia stream via the multimedia session, a third computer code for monitoring the media quality of the multimedia stream, and a fourth computer code for passively computing a subjective quality of the multimedia stream.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DETAILED DESCRIPTION THE PREFERRED EMBODIMENTS

Figure 1A:
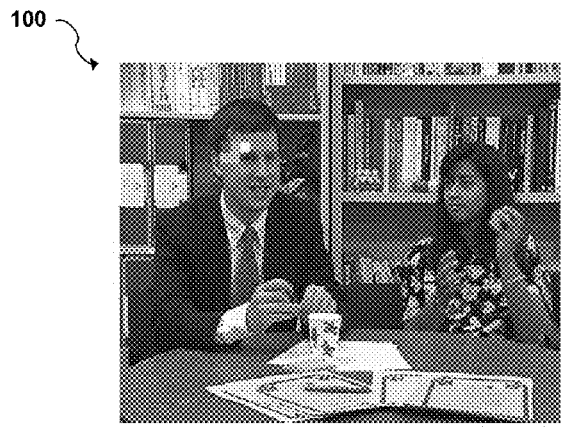
FIGS. 1-2 are exemplary illustrations showing video frame distortions due to errors resulting from transfer over a packet-based network.
Figure 1B:
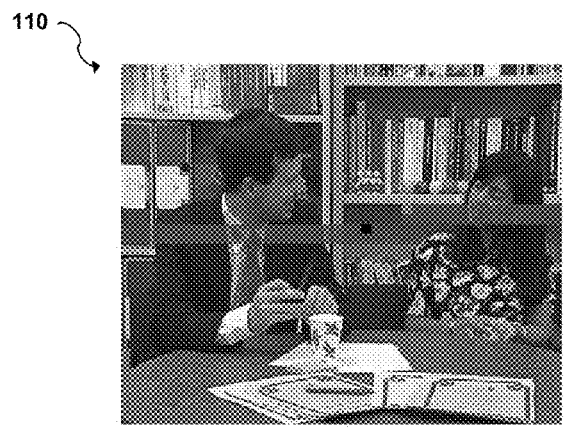
Figure 1C:
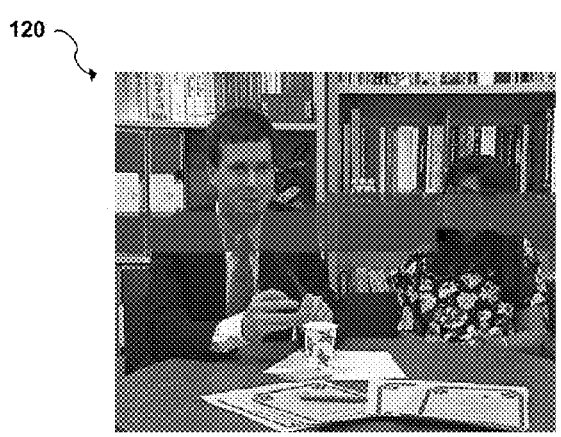
Figure 2A:
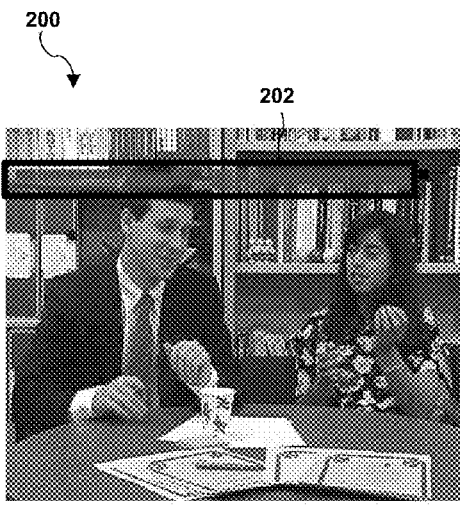
Figure 2B:
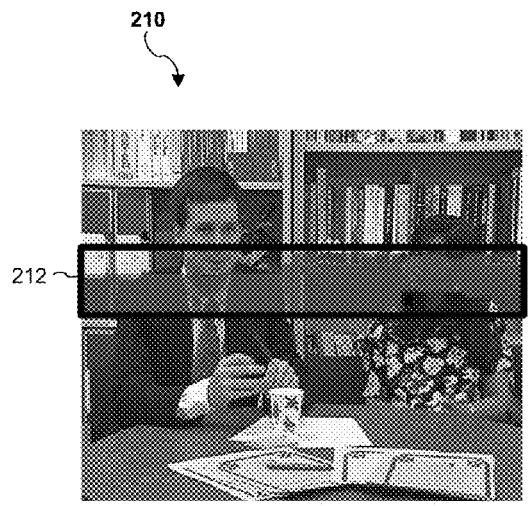
Figure 2C:
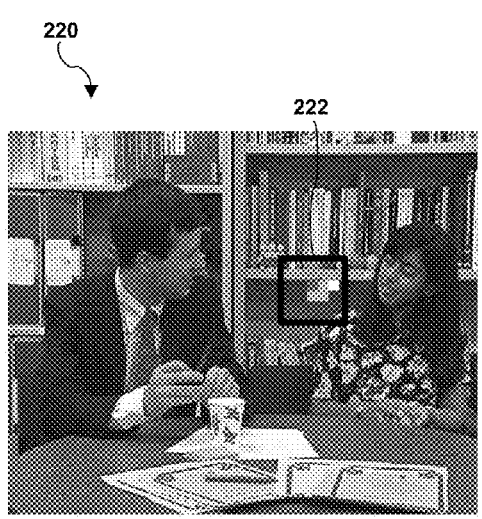
Figure 2D:
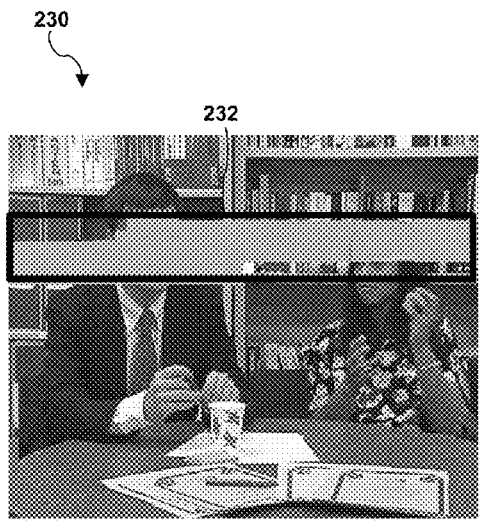
Figure 3:
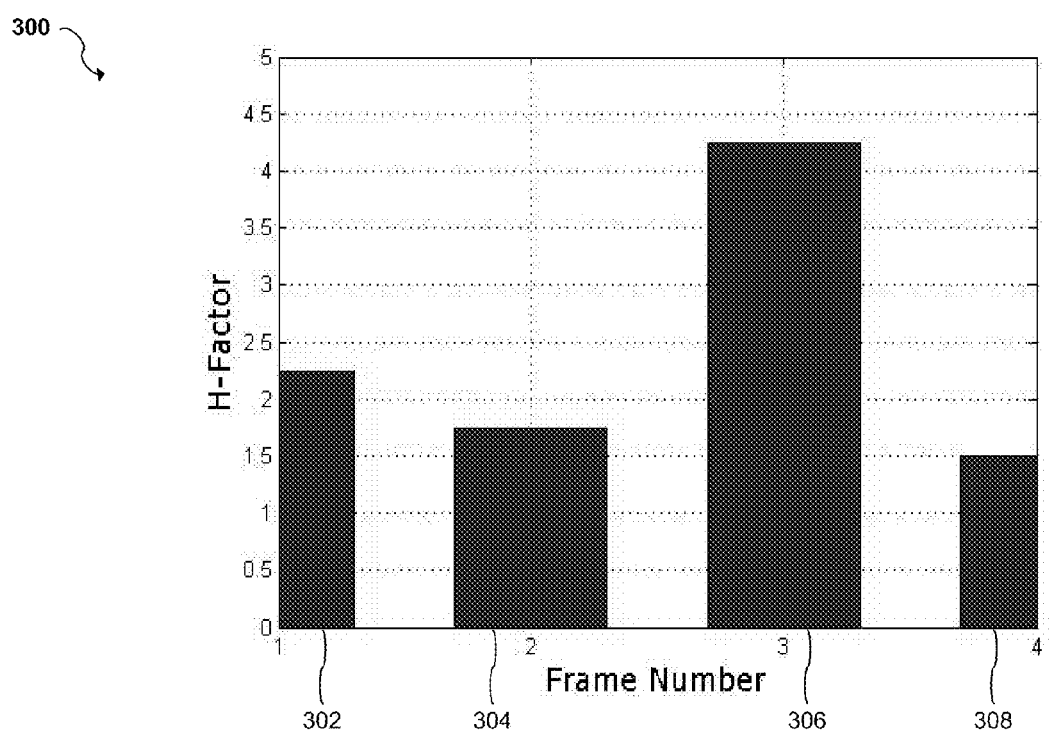
FIG. 3 is a chart illustrating the variation of spatial and temporal video contents of the exemplary video frames shown in FIGS. 2A-2D.

Referring now to the drawings, wherein like reference numerals designate identical or corresponding parts throughout the several views, preferred embodiments of the present invention are described.

Evaluating the quality of streaming multimedia (e.g., live, stored, IPTV, VoIP sessions, and Telepresence) as perceived by remote clients over a delay and loss tolerant network is necessary to understand the time variant quality of service (QoS) which the underlying communication network and the client device are able to support. Such information may be used by the content delivery providers (CDPs), digital television and high-definition television (HDTV) broadcasters, Telepresence service provider, voice-over-Internet protocol (VoIP) service providers, and network designers in deducing the subjective level of the service provided. The present invention relates to a method and computer program for evaluating streaming multimedia quality by monitoring and measuring the media quality of the session at the client end.

Traditionally, such monitoring has been carried out by observing the variations of network dynamics along the dimensions of packet loss, delay and jitter. However, packet loss and delay do not necessarily translate into poor multimedia quality because whether a multimedia frame is correctly decoded may depend on the error-concealment techniques defined by the respective multimedia standards (e.g., MPEG-2, MPEG-4, and H.264). For example, for the same packet loss, a H.264 decoder might be able to correctly recover a multimedia frame which would have been discarded by an MPEG-2 decoder. Also, the multimodal association of sensory signals in human cortex plays a significant role in multimedia experience.

This present invention relates to a method and computer program which enables a quality determination of the delivered multimedia streams as perceived by the clients The present invention may be used to monitor the video and stereo audio for establishing SLA to gauge the performance of high-quality multimedia delivery in communication networks. The present invention may also be used in the home and mobile entertainment market.

In one embodiment, the present invention passively computes the subjective quality of audio and/or video transported over a communication network to one or more remote clients, at the client end, by analyzing the impact of different types of information like context, motion, content and synchronization of multiple streams. It also uses information theoretic measurements.

In one embodiment, the present invention accurately measures the information contents of the context at both the source of the information (i.e., the server) and its destination (i.e., a remote client) to determine the deviation in an uncertain environment.

In one embodiment, the present invention captures the impact of relative deviation of the audio and video sensory signals at display time by assessing the multimodal cortex association distortion on the subjective multimedia quality.

In one embodiment, the present invention identifies individual multimedia frame loss at the application layer (not network packet loss) and may link the different frame type losses to the subjective media quality.

In one embodiment, the present invention detects in-sequence and/or out-of-sequence packets and its impact on multimedia subjective quality.

In one embodiment, the present invention is highly parametric and outputs the results in a compressed data format which requires minimum bandwidth for data transfer.

In one embodiment, the present invention is independent of network infrastructure and protocols.

In one embodiment, the present invention is adaptable to the variation of multimedia CODEC computer programs. As used herein, the term "CODEC" refers to a device or computer program capable of performing encoding and decoding on a digital data stream or signal.

In one embodiment, the present invention continuously, or at least substantially continuously, measures the multimedia quality of the session and presents multiple measurement parameters. The multiple measurement parameters include, without limitation, media context score, media association score, comprehensive media quality and the like. These parameters are indicators to different areas of the multimedia transmission distortion and may be used to correct multimedia transmission distortion.

The present invention provides a new approach and metric for quantifying the perceived quality of multimedia streams as they are displayed by the media player at the remote client end. In one embodiment, the server portion is (i) processing-lite (i.e., does not consume excessive computing resources), (ii) non-obtrusive (i.e., does not require substantial changes to the client software), and (iii) able to capture the communication network dynamics and the error resiliency features of the decoder. Said another way, the server is configured to measure the stream quality from the viewpoint of the remote user.

Figure 5:
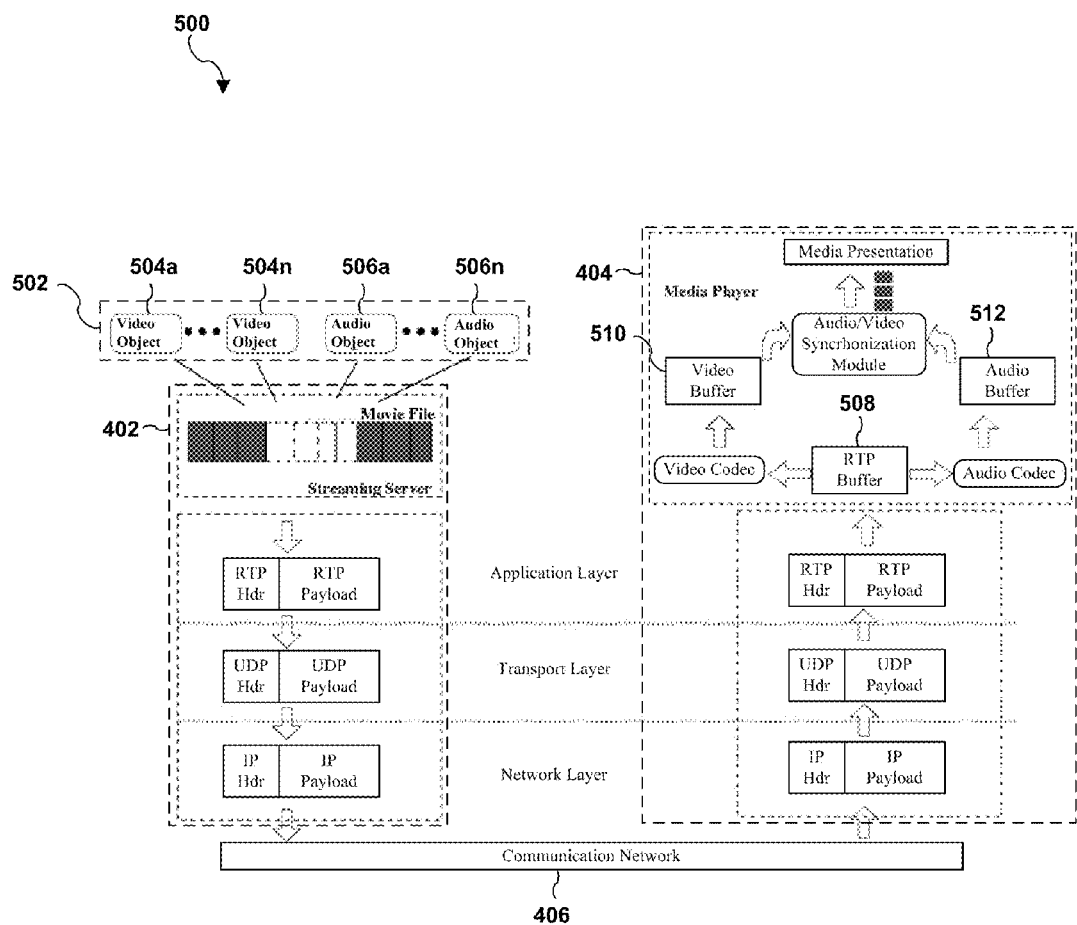
FIG. 5 is a block diagram illustrating an architecture of multimedia streaming in accordance with an embodiment of the present invention.

The present invention, referred to as the "StreamHunter," operates in a client-server framework. A client, referred to as the "ClientHunter," is able to simultaneously capture the uncertainty arising due to variations in dynamics at the network and application layer. In one embodiment, the client operates as a hook inside the client decoder. ClientHunter selectively and intermittently sends information to a server, referred to as the "ServerHunter." ServerHunter analyzes the information and identifies the "demons" (e.g., situations where dropped frames result in poor quality video) and the "angels" (i.e., error free situations). A high-level architecture of such a scheme is illustrated in FIG. 5.

In one embodiment, the results of information theory are utilized to provide an efficient solution for evaluating streaming multimedia quality.

As is well known by those of ordinary skill in the art, encoded video frames are typically classified into three types: I frames, P frames and B frames. An I frame is coded spatially, a P frame is forward predicted based on previous I and P frames, and a B frame is coded based on a forward prediction from a previous I or P frame, as well as a backward prediction from a succeeding I or P frame.

As used herein, a streaming server is a computer program that streams multimedia video and audio frames through separate network ports to a remote client. The transmission is controlled by different network protocols so that the synchronized audio and video frames are lined up in time after decoding for playing.

In one embodiment, ClientHunter is implemented within the streaming server to transmit the multimedia clip, perform on line information theoretic measurements and to insert measurements on the multimedia clip for receive side measurements.

In one embodiment, ClientHunter is implemented incorporating MPlayer. However, it is to be understood that the present invention is not restricted to MPlayer and that ClientHunter may implemented on any media player software. This embodiment is described by considering MPlayer as Media software. MPlayer is an open source multimedia application. MPlayer has two essential components implemented at the application layer of the protocol stack: a demultiplexer and a decoder. The demultiplexer separates the incoming streams from the underlying protocol stacks and stores the media data in different buffers depending on the stream types. The audio and video playing components use the buffered data for further decoding. Finally, the decoded data is presented to the client. MPlayer uses stream headers to handle the incoming streams. There are two types of stream headers. This contains every parameter essential for decoding, such as input/output buffers, chosen CODEC, FPS, etc. There are parameters for each stream in the file. At least one for video, if sound is present then another for audio, but if there are more, then there will be one structure for each. The chosen stream header and its demuxer are connected together. In one embodiment, the presentation includes, without limitation, the following steps:

1. Iterate while end of file is reached
2. Continue if byte space is available that can be played without blocking else go to step 5
3. Fill audio buffer by reading and decoding audio data and increase a_pts 4. Read and decode a single video frame and increment the v_pts
5. Sleep until a_pts≧v_pts
6. Display the frame
7. Apply audio-video PTS correction to a_frame
8. Handle user interface events (e.g., pause, seek, etc.)
9. End In one embodiment, if the decode procedure fails or results in an error, the corresponding audio or video frames are dropped before the presentation is carried out. However, the current stream position will always reflect the current presentation of video or audio objects. Before decoding a media frame, the media frame is fetched from the input RTP buffer. A look ahead buffer reads a portion of media bytes from the RTP buffer. The size of the RTP buffer is determined during the initial real-time streaming protocol (RTSP) handshaking mechanism between the multimedia player (e.g., MPlayer) and the streaming server. The size of the look ahead buffer is larger than the RTP buffer. This ensures that the decoder has something to decode at all times. When a request for reading the next frame is received, a check is performed to ensure that there is no previously saved portion of the look ahead buffer. If something remains in the look ahead buffer, the next frame is constructed with the remaining bytes and then returned for decoding. If there are no remaining bytes in the look ahead buffer, the RTP buffer contents are copied in the look ahead buffer and the process is repeated until there are no more bytes to be read from the incoming stream (i.e., the streaming is concluded). Before sending back a media frame for decoding and presentation, a check is performed to ensure that its presentation time stamp (PTS) is not far behind the other stream. If the PTS is far behind the other stream, then the frame is discarded and another frame is retrieved instead. If the stream is excessively far behind, then the frame is allowed because this likely means that there was an error in the source's timestamp synchronization. A threshold has been defined to handle the PTS of each frame. After reading a frame, a ptsbehind variable is calculated for the current frame by analyzing the PTS of the previous frame.

The multimedia player (e.g., MPlayer) synchronizes the different types of streams. The presentation quality may be poor and jittery depending on the synchronization techniques. Synchronization is handled by a PTS unit.

In one embodiment, various protocols (e.g., RTSP, SIP) may be used to implement the streaming architecture. For example, RTSP is used to explain this embodiment. RTSP messaging is used for the initial handshaking mechanism. RTSP may also be used to control the streams while they are being played. Similarly, SIP messages can be used to achieve the same.

The initial SETUP from the above protocols request for a uniform resource identifier (URI) specifies the transport mechanism to be used for the streamed media. A remote client can issue a SETUP request for a stream that is already playing to change the transport parameters, which the streaming server may or may not allow. For the benefit of any intervening firewalls, a remote client typically indicates the transport parameters even if it has no influence over these parameters.

The information received from the network layer is combined with the decoding information available at the media layer to estimate the multimedia quality. Existing techniques that are based on approximation algorithms which approximate the video quality to packet loss and delay characteristics fail to capture the error concealment techniques defined under the current multimedia standards (e.g., H.264) and the cortex association impacts of audio video signals. In addition, no human interference for quality checking like the ITU specified MOS techniques is required.

In one embodiment, the present invention passively monitors the transformation of the significant frames and uses information theoretic metrics to compute the quality of the video. The information theoretic measurement may include measuring the information content of the video frames at transmit and receive ends by measuring the individual information content of the macro blocks. The information theoretic distance between the two measurements of the same frame provides the amount of information lost or distorted due to network impediments. This information also includes the frame loss contribution where complete information is lost. The empirical relation of this loss caused by different types of frames like I, P and B to MOS are different. A trans-saccadic integration mechanism that fills the intervals with a 'fictive' movie, and create a composition of the image just before and after a loss of information for the P and B frames. The effect of I frame information loss is more significant because it contains the context information of the video scene and thus the trans-saccadic integration technique cannot be used. It is observed that the information of contextual modulation in the overall visual scene has the maximum visual response and deserves higher empirical weight. The distance between audio and video signals from the association margin of the acceptable subjective experience of the brain may also be measured. Metrics that are reported for gauging the subjective quality include, without limitation, media context score, media association score and comprehensive media quality.

By using a weighted empirical relation of network measurements impacts on the coding scheme, derivation of the multimedia synchronization and information theoretic parameters, the present invention is able to remotely measure the quality of multimedia stream as perceived by the user.

Figure 4:
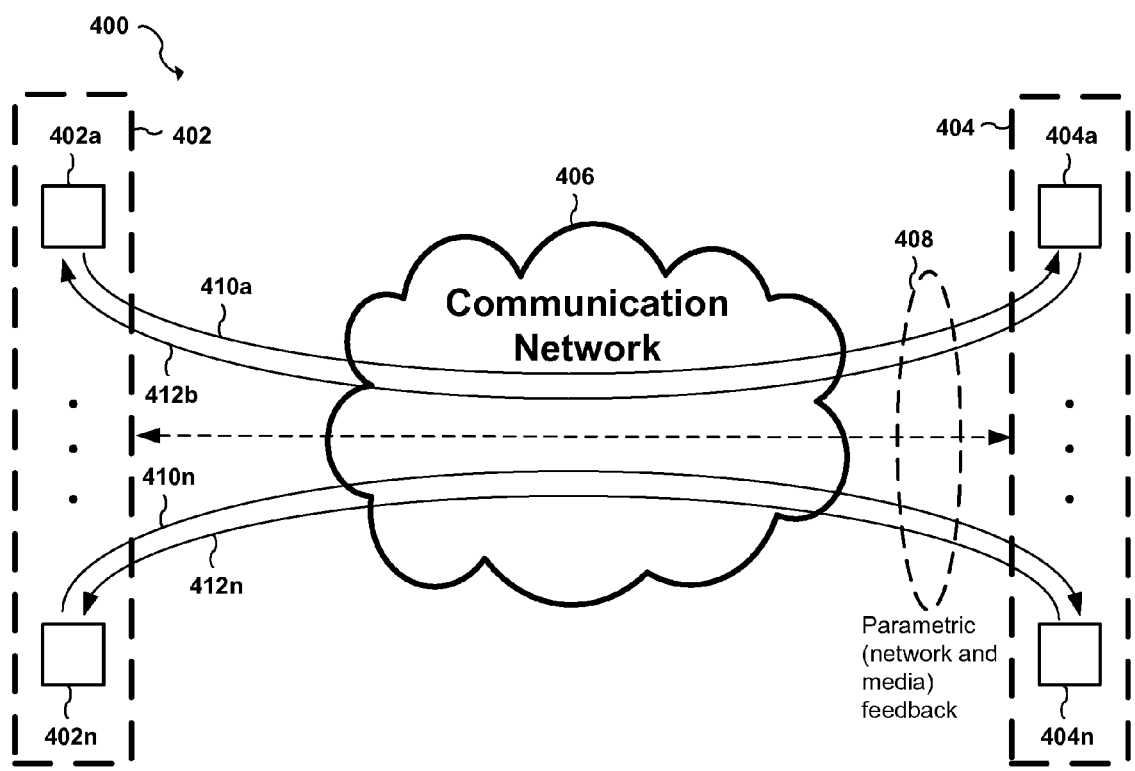
FIG. 4 is a block diagram illustrating a system for evaluating streaming multimedia quality in network environment in accordance with an embodiment of the present invention.

Referring to FIG. 4, a block diagram illustrating a system for evaluating streaming multimedia quality in network environment in accordance with an embodiment of the present invention, is shown. According to this embodiment, one or more content servers 402a-402n transfers one or more multimedia digital streams 410a-410n over a network 406. As used herein, block 402 represents one or more content servers 402a-402n, which may optionally be a content server farm. Multimedia digital streams 410a-410n include, but are not limited to, a plurality of audio, video, text, picture or telemetry digital streams of an application. Each multimedia digital stream 410a-410n may be coded by its own set of coding rules and transported through different network connections, or multiplexed into a single network connection at the transport or lower level. The multimedia digital streams 410a-410n from the one or more content servers 402a-402n may be related through a spatial and temporal association. One or more remote clients 404a-404n receive the multimedia digital streams 410a-410n over the network 406 using a combination of multiplexed or separate transport connections, restore the spatial and temporal relations of the multimedia digital streams 410a-410n, and play the multimedia service. The quality of the presentation is then determined by either a device or an individual. As used herein, block 404 represents one or more remote clients 404a-404n. In one embodiment, the one or more remote clients 404a-404n are configured to empirically quantify the subjective quality of the presentation, represented as a media score. The subjective quality of the presentation may be quantified in real time or on an off-line basis. The media score may be used for numerous purposes including, without limitation, as a feedback loop to improve the quality of the presentation in real-time, for assessing the fitness of a network between two or multiple points, and for testing existing user service quality. The user service quality may also be used to resolve customer complaints. Optionally, the multimedia digital streams 410a-410n may be subjected to parametric and information theoretic feedback 408 as discussed below.

Referring to FIG. 5, a block diagram illustrating an architecture of multimedia streaming in accordance with an embodiment of the present invention, is shown. The streaming mechanism is used to obtain the different measure parameters required for in-line and off-line estimates of the media score. A content server 402 appropriately links one or more different multimedia objects 502 together for transmission over the Internet, Intranet and the like to one or more remote clients 404 such that the multimedia service can be recreated from the received packets at the one or more remote clients 404. Multimedia objects 502 include, without limitation, one or more video objects 504a-504n, and/or one or more audio objects 506a-506n. The multimedia objects 502 are mapped to different transport layer connections and appropriate headers are added. According to one embodiment, the transport layer packets are encapsulated in UDP for a RTP/UDP type transfer. The packets are further encapsulated to the IP layer by adding an IP header. The packets are then transported over a communication network 406 to one or more remote clients 404. The communication network 406 may include, without limitation, the Internet, Intranet and the like. At the receiving end, the headers are used to assemble of the transport layer connections and to capture the transport layer packets. From those packets, the multimedia objects 502 are recovered as frames and delivered to the respective decoder for decoding. The decoded packets are placed in one or more playout buffers (such as, without limitation, video buffer 510 and audio buffer 512) for multimedia streaming. Any loss of information or delay in information is captured to estimate the media score at one or more remote clients 404 receiving the information. As used herein, a media score represents the closeness of the received multimedia with respect to the original multimedia signal. In one embodiment, the media score is measured on a score of 1 to 5, where 5 is excellent. However, other scales are obviously possible within the scope of the present invention. In one embodiment, the media score is subjectively assessed through an human interface by an individual.

Referring to FIGS. 6-12, flow charts illustrating a method for evaluating streaming multimedia quality in accordance with an embodiment of the present invention, are shown.

Figure 6:
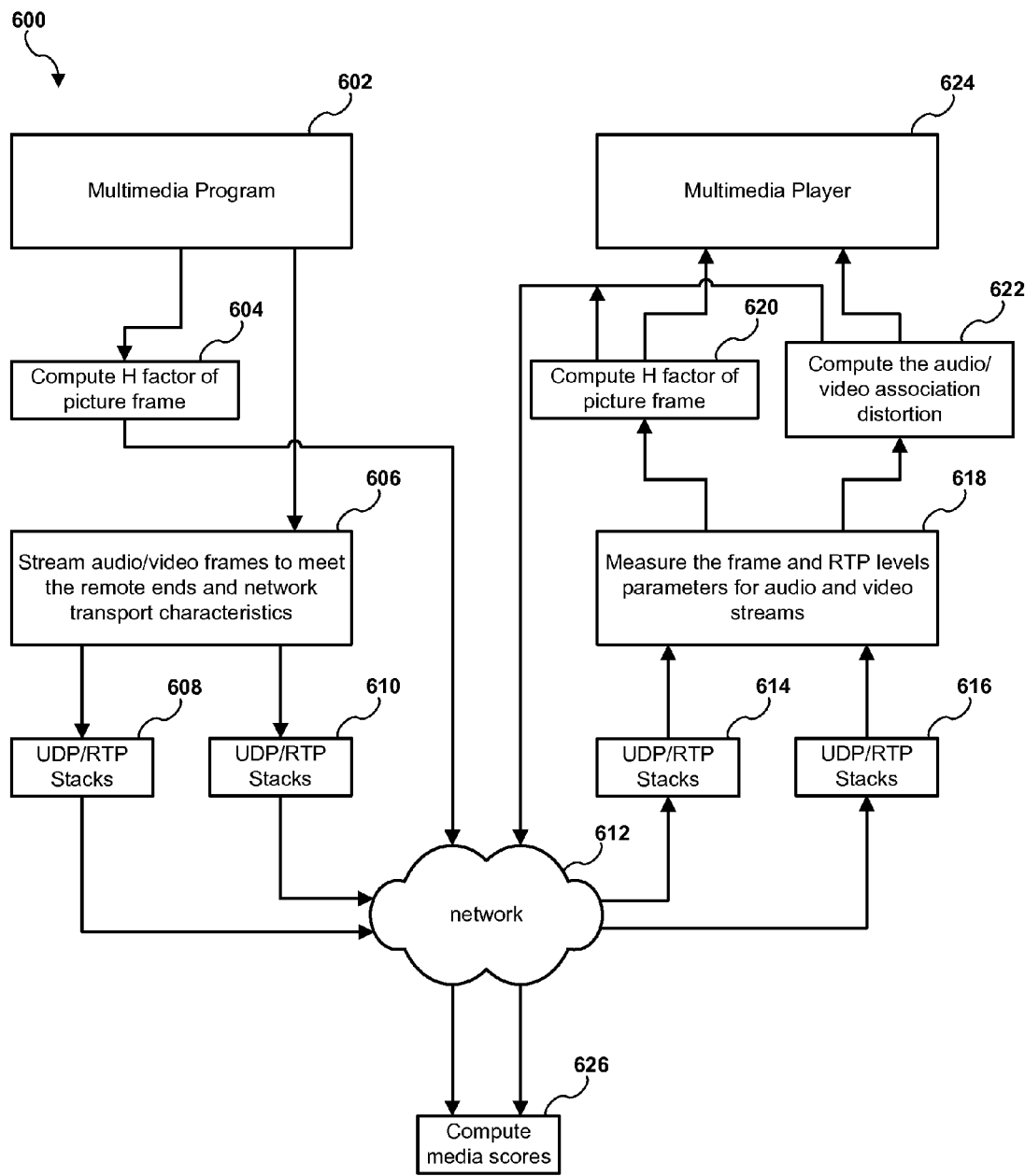
FIGS. 6-12 are flow charts illustrating a method for evaluating streaming multimedia quality in accordance with an embodiment of the present invention.

As shown in FIG. 6, multiple live multimedia streams (e.g., audio, video signals of streaming video services like Telepresence, Football game) are captured, packetized and coded. At block 602, the coded media frames are received by a multimedia program. The audio and video frames are transmitted for further transfer, as shown at block 606. The proposed algorithm estimates the information (entropy) content of the complex digital frames (e.g., video frames) prior to transmission, as shown at block 604. The entropy calculation uses the information content of the macro blocks. Information theory is used to compute the H-factor of each frame. The H-factor of the frame represents quantatively the amount of information captured in the frame. Different frames of a scene result in different H-factor values due to the complexity of the scene captured in that particular frame. This H-factor is the reference for determining the information lost during the transfer of data through the network. The H-factor values are transferred on real time to block 626 to estimate the media score. At block 606, the streaming process of the multiple media is set up by the streaming server process to get the best result at the receive end play out. It is possible to dynamically control the streaming server process by network protocols like RTCP to change the streaming rate based on network uncertainty that will improve the playout quality. The RTP/RTCP protocol is used for exemplary purposes. However, it is to be understood that the present invention is agnostic to a particular network protocol type. Once the frames' streaming times are determined, the RTP packets are transmitted over UDP for the different media connections by using RTP/UDP stacks like those shown at blocks 608 and 610. The RTP packets are transferred through a delay/loss network as indicated by network 612 and the RTP packets are received at the receiving end at blocks 614 and 616. The received RTP packets are transferred to block 618 for computing the parametric (network and media) measures needed for remote monitoring of multimedia quality. It also constructs the media frames and determines the frame loss of a media. The quality of the media score also depends upon this loss of packets and these information is periodically transferred to block 626. The received audio and video frames are transferred to block 622 for decoding and play out. Block 622 measures the timing differences of the audio and video frames for play out to ensure that the correct audio is played when the video scene is refreshed to ensure audio video synchronization. The difference in the timing of these associated frames are measured by block 622 and transferred to block 626 as input for media score computation. Side by side, block 618 transfers the video frame to block 620 to compute the H-factor of the received frames. The new H-factor will capture the loss of information of a received frame due to channel errors. These H-factors are also periodically transmitted to block 626. Block 622 transfers the frames for play out to block 624. Periodically, based on a time window, block 626 uses all of the inputs received from blocks 604, 618, 620 and 622, and computes the media score using an empirical equation that assigns appropriate weight to the different parameters based on the receiver capability. This media score represents the quality of the multimedia transfer and can be used for a closed loop system to adjust the parameters of the multimedia transfer. The cost function of such closed loop system will depend upon the applications, for example in case of video streaming the cost function can be the multimedia subjective quality (MOS).

Figure 7:
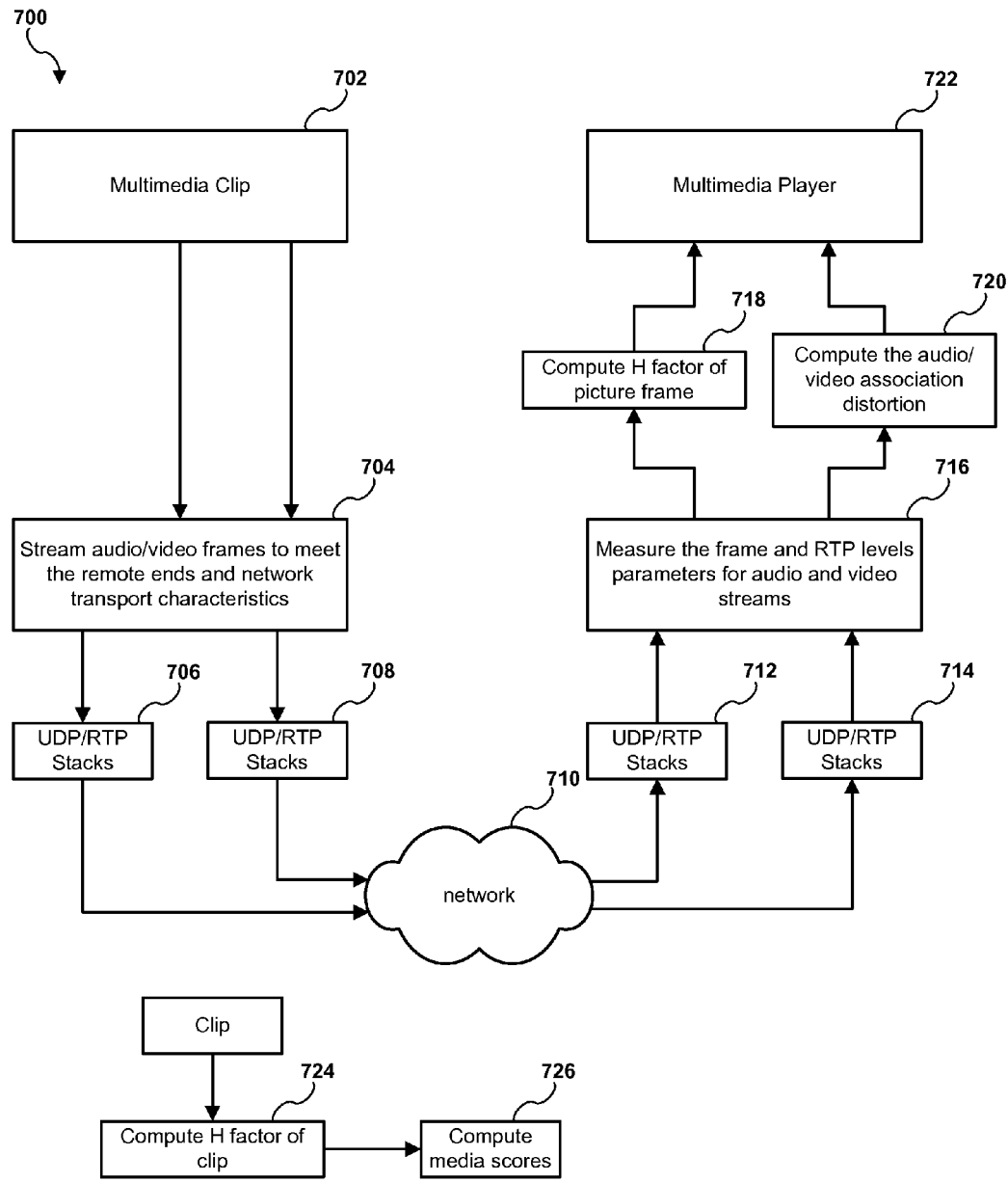

FIG. 7 processes are the similar to FIG. 6 except the input media stream is not for a live multimedia transfer. Here a prerecorded multimedia file or a multimedia Clip is transferred to assess the network condition for new multimedia services like IPTV. This also can be used to test an existing multimedia service like IPTV connection for a customer, when a service complaint is received at the customer care. In FIG. 7, element 702 is the file or clip library that is available to a test engineer for testing. One file or clip is selected and transferred to a streaming server streaming process, at block 704. The rest of the process is very similar to FIG. 6 except the data transfer point of blocks 716, 718, and 720 to block 726. In this case the collected data is transferred at the end of the test. The data during the test is stored in the respective elements during the test. As the file and clip library is available at block 724, the H-factor for sending end multimedia are computed at block 724 and stored. Stored measurement data from Blocks 716, 718 and 720 are transferred to Block 726 after the completion of test clip execution at the receive end. Block 726 uses the same algorithm as block 626 to compute the media score. This media score results are used for network assessment for new services or for resolution of customer service complaints.

Figure 8:
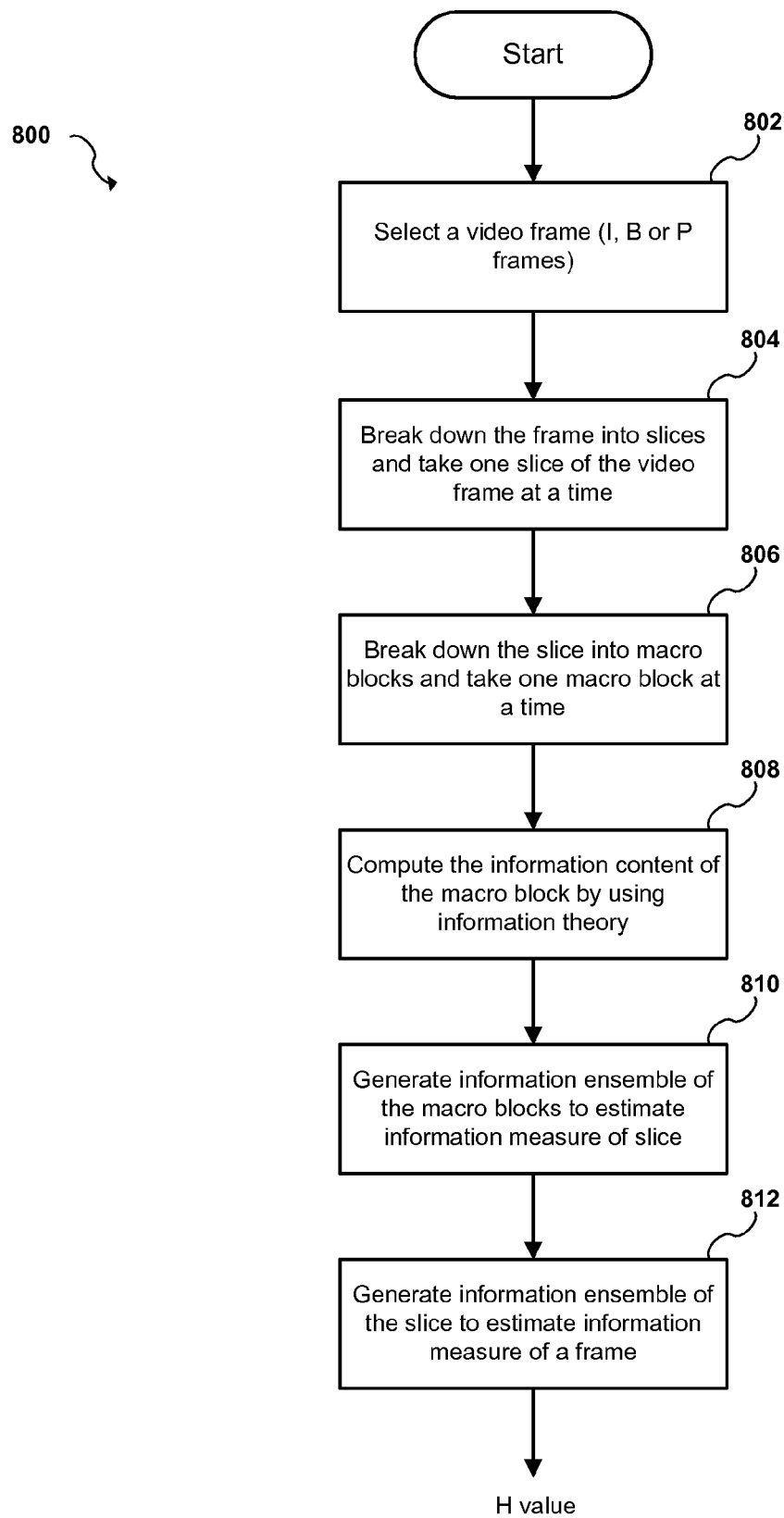

FIG. 8 shows the steps for H-factor calculation process inside blocks 604 and 724. A stream of video frames comes from block 602 or from media file or clip. This algorithm is applicable for any complex coded frame structure like video coding. Each video frame is classified into classes for efficient compression like I, P, B etc for MPEG or H.264 at block 802. From the frame select a slice at block 804. From the frame and slice select the macro blocks one at a time at block 806. At block 808, the state of the macro block and sub macroblock is computed. This process is repeated for all the macro blocks and sub macroblocks of the slice at block 810 and for frame at block 812 to get the probability distribution of the states. Then information theory is used to compute the entropy of the frame from this distribution and finally obtain the H-factor of the frame.

Figure 9:
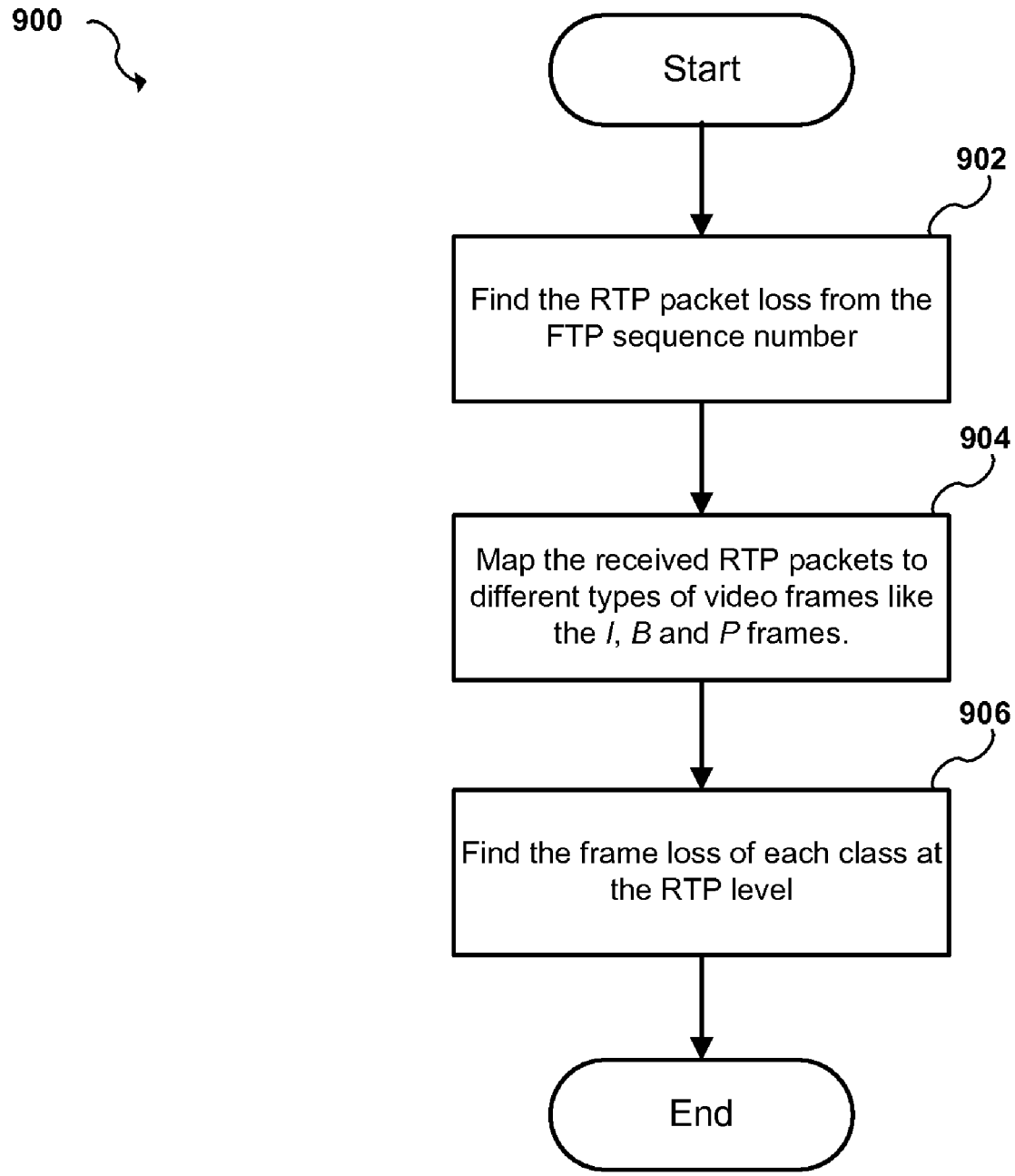

FIG. 9 is the computation of RTP packet loss and frame loss of the different media streams with complex coding structures like video. The RTP packet loss is computed from the RTP sequence numbers at block 902. At block 904, the RTP packets are mapped to the different frames like I, B, P in video. Knowing the RTP sequence numbers of the start and end RTP packets of a frame. From this frame loss is determined. In 906, for each class of frame, the frame loss statistics are determined.

Figure 10:
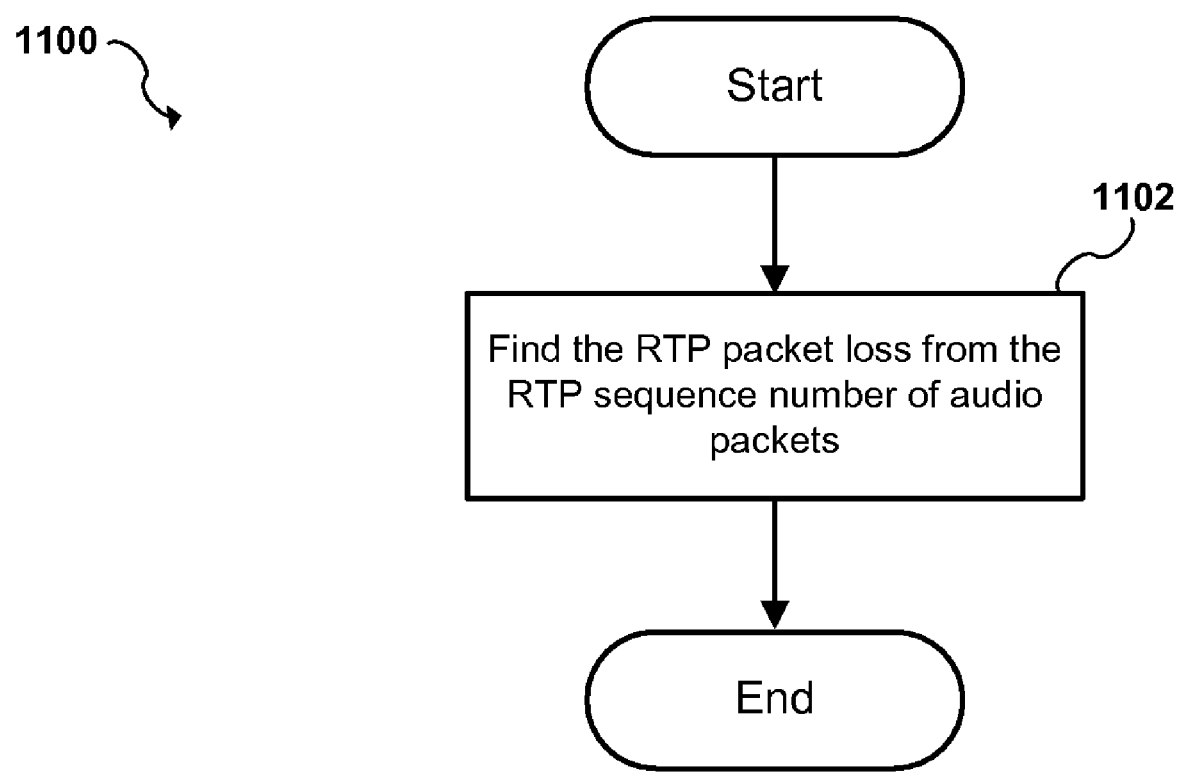

FIG. 10 shows the computation of RTP packet loss for media frames that can accommodate multiple media frames in one RTP packet like audio. Block 1002 computes the RTP packet loss of audio based on RTP sequence number.

Figure 11:
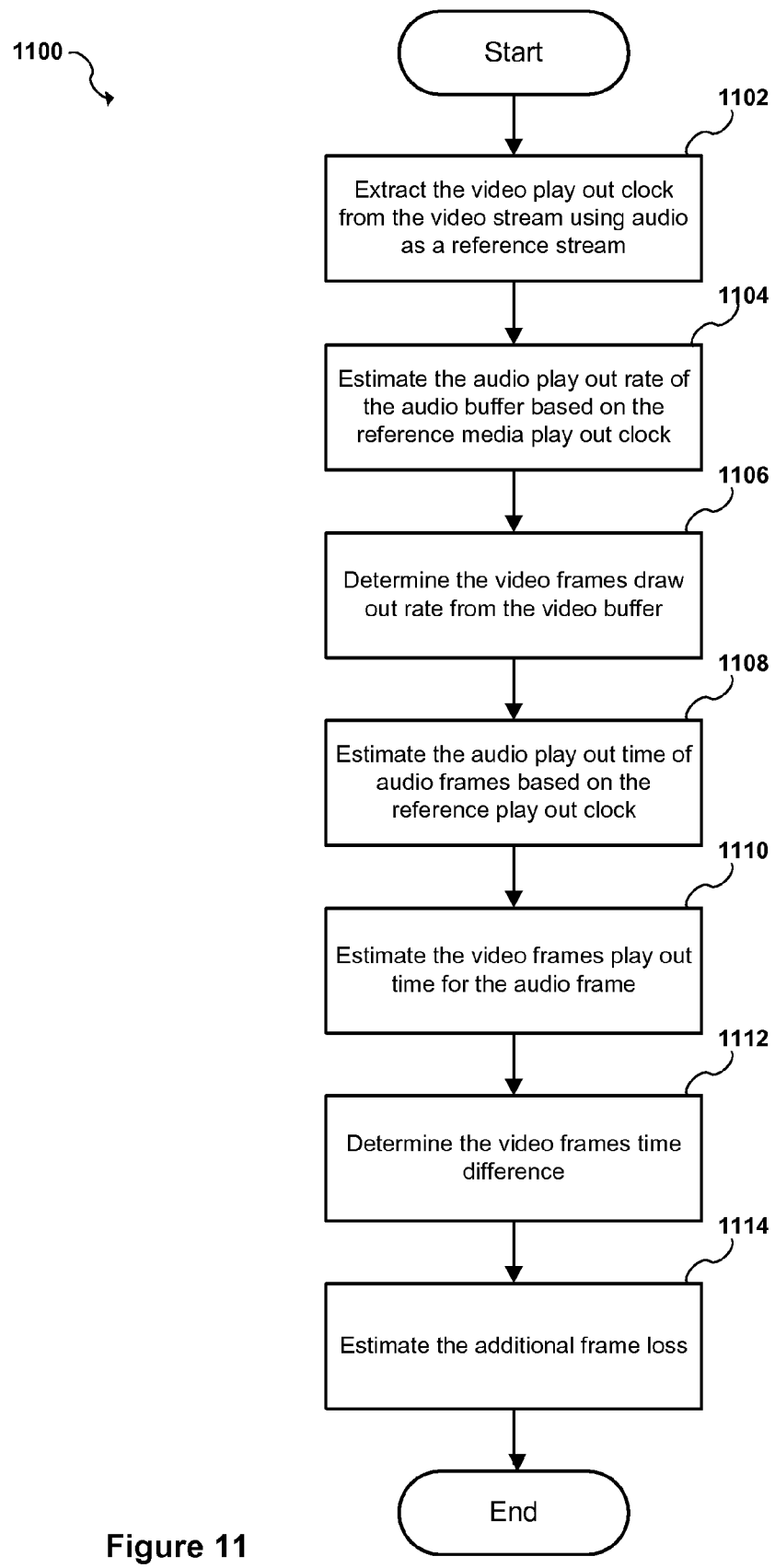

FIG. 11 explains the algorithm used to estimate the association coefficients of the two or more digital streams. In this case algorithm is explained by audio and video streams for multimedia system. One of the stream will be the reference time for playing out the multimedia streams like audio stream in this example. This reference clock is used in the block 1102 and determines the video frames play out time. Block 1104 determines the play out rate based on the audio frames clock time. At block 1106, the video frames draw out rate is determined. Based on this rates of audio and video frames and the clock time for audio frames to maintain the frames per sec as close to rate as possible, the audio and video frames play out times are estimated at blocks 1108 and 1110. From this play out time estimation, the difference of audio and video frames timing provides the association measure at block 1112. In this process, it may so happen that video frames are thrown out because they are late to maintain the screen refresh rate. This is determined at block 1114 and this causes the additional video frame loss.

Figure 12:
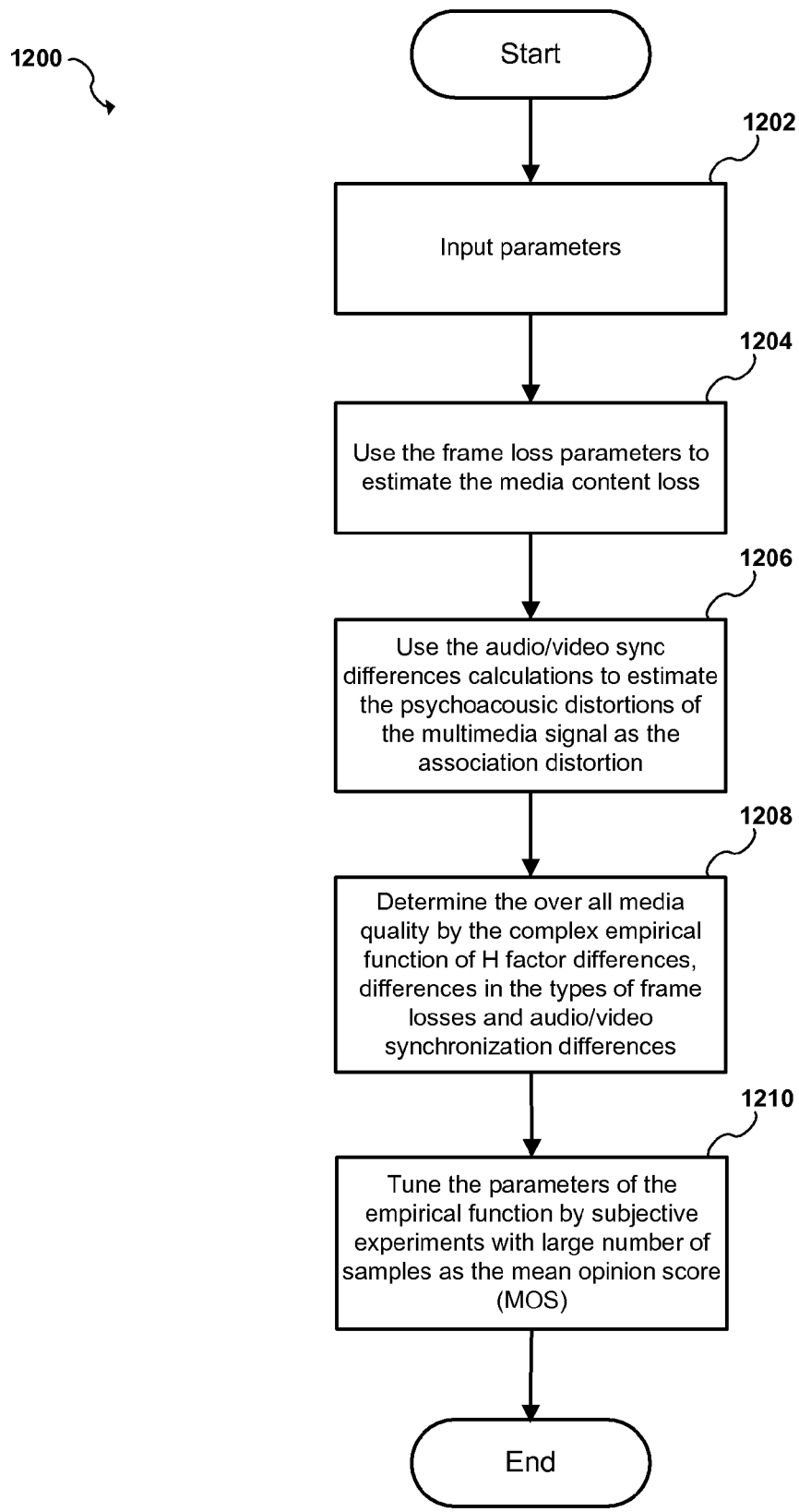

FIG. 12 explains the algorithm used in the media score calculation at blocks 626 and 726. All the input parameters are received at block 626 or block 726 for media score calculation. In a time window these parameters are collected at block 1202. On completion of the time window, the Frame Loss and RTP packet loss data is used in an empirical relation to estimate the media quality at block 1204. At block 1206, the input parameters received from association estimates are added in the empirical equation at block 1204 to estimate the media score. At block 1208, the distance between the H factors of transmit and receive end is added in the final correction of the empirical equation to determine the media score. Finally at block 1210 the empirical equation of the block 1208 is tuned by the subjective measurement data of the media score to get the final form of the empirical equation of the media score.

The present invention thus includes a computer program which may be hosted on a storage medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A method for evaluating multimedia quality, the method comprising:
   receiving, at a client data processing system, multimedia content from a multimedia server, wherein the multimedia content comprises a plurality of audio frames containing audio information content and a plurality of video frames containing video information content;
   at the client data processing system, computing an information theoretic measurement for at least one of the video frames, wherein the information theoretic measurement measures complexity of the video information content of the video frame; and
   using the information theoretic measurement to compute a quality measurement for the multimedia content received by the client data processing system; and
   wherein the operation of using the information theoretic measurement to compute the quality measurement for the multimedia content received by the client data processing system comprises computing the quality measurement based on factors including:
      the information theoretic measurement; and
      a measurement of synchronization between the audio frames and the video frames.

2. A method according to claim 1, wherein:
   the information theoretic measurement computed at the client data processing comprises a downstream information theoretic measurement; and
   the method further comprises:
      receiving, at the client data processing system, an upstream information theoretic measurement for the video frame, wherein the upstream information theoretic measurement measures complexity of the video information content of the video frame at the multimedia server; and
      using the upstream and downstream information theoretic measurements for the same video frame to compute the quality metric.

3. A method according to claim 2, wherein the operation of computing the quality measurement for the multimedia content received by the client data processing system is performed by the client data processing system.

4. A method according to claim 1, wherein the operation of computing the information theoretic measurement for at least one of the video frames comprises:
   computing multiple information content measurements for respective portions of the video frame; and
   using the multiple information content measurements to compute an entropy measurement for the video frame.

5. A method according to claim 1, wherein the operation of computing the information theoretic measurement for at least one of the video frames comprises:
   computing multiple state measurements for respective portions of the video frame;
   computing a probability distribution for the multiple state measurements;

computing an entropy measurement for the video frame, based on the probability distribution for the multiple state measurements; and computing an H factor for the video frame, based on the entropy measurement.

6. A method according to claim 1, wherein:

the operation of receiving multimedia content from the multimedia server comprises receiving a multimedia stream from the multimedia server; and the operations further comprise:

generating decoded view frames from the video frames; and displaying the decoded video frames for an end user.

7. A method according to claim 1, wherein the multimedia content comprises at least one type of content from the group consisting of: a live multimedia session, a stored multimedia session, a Internet protocol (IP) television (IPTV) session, a voice over IP session, and a Telepresence session.

8. A method according to claim 1, wherein the operation of using the information theoretic measurement to compute the quality measurement for the multimedia content received by the client data processing system comprises:

computing the quality measurement based on measurement parameters comprising:

a frame loss factor.

9. An article of manufacture, comprising:

a machine accessible storage medium; and instructions in the machine accessible storage medium which, when executed by a data processing system, enable the data processing system to perform operations comprising:

after the data processing system has established a multimedia session for receiving multimedia content from a multimedia server, wherein the multimedia content comprises a plurality of audio frames containing audio information content and a plurality of video frames containing video information content, computing an information theoretic measurement for at least one of the video frames, wherein the information theoretic measurement measures complexity of the video information content of the video frame; and using the information theoretic measurement to compute a quality measurement for the multimedia content received by from the multimedia server; and wherein the operation of using the information theoretic measurement to compute the quality measurement for the multimedia content received by the client data processing system comprises computing the quality measurement based on factors including:

the information theoretic measurement; and a measurement of synchronization between the audio frames and the video frames.

10. An article of manufacture according to claim 9, wherein:

the information theoretic measurement computed at the client data processing comprises a downstream information theoretic measurement; and the operations further comprise:

receiving, at the client data processing system, an upstream information theoretic measurement for the video frame, wherein the upstream information theoretic measurement measures complexity of the video information content of the video frame at the multimedia server; and using upstream and downstream information theoretic measurements for the same video frame to compute the quality metric.

11. An article of manufacture according to claim 9, wherein the operation of computing the information theoretic measurement for at least one of the video frames comprises:

computing multiple information content measurements for respective portions of the video frame; and using the multiple information content measurements to compute an entropy measurement for the video frame.

12. An article of manufacture according to claim 9, wherein the operation of computing the information theoretic measurement for at least one of the video frames comprises:

computing multiple state measurements for respective portions of the video frame;

computing a probability distribution for the multiple state measurements;

computing an entropy measurement for the video frame, based on the probability distribution for the multiple state measurements; and computing an H factor for the video frame, based on the entropy measurement.

13. An article of manufacture according to claim 9, wherein:

the operation of receiving multimedia content from the multimedia server comprises receiving a multimedia stream from the multimedia server; and the operations further comprise:

generating decoded view frames from the video frames; and displaying the decoded video frames for an end user.

14. An article of manufacture according to claim 9, wherein the operation of using the information theoretic measurement to compute the quality measurement for the multimedia content received by the client data processing system comprises:

computing the quality measurement based on measurement parameters comprising:

a frame loss factor.

15. A data processing system comprising:

a processor;

a machine accessible storage medium responsive to the processor; and instructions in the machine accessible storage medium which, when executed by the processor, enable the data processing system to perform operations comprising:

after the data processing system has established a multimedia session for receiving multimedia content from a multimedia server, wherein the multimedia content comprises a plurality of audio frames containing audio information content and a plurality of video frames containing video information content, computing an information theoretic measurement for at least one of the video frames, wherein the information theoretic measurement measures complexity of the video information content of the video frame; and using the information theoretic measurement to compute a quality measurement for the multimedia content received by from the multimedia server; and wherein the operation of using the information theoretic measurement to compute the quality measurement for the multimedia content received by the client data processing system comprises computing the quality measurement based on factors including:

the information theoretic measurement; and a measurement of synchronization between the audio frames and the video frames.

16. A data processing system according to claim 15, wherein:

the information theoretic measurement computed at the client data processing comprises a downstream information theoretic measurement; and the operations further comprise:

receiving an upstream information theoretic measurement for the video frame, wherein the upstream information theoretic measurement measures complexity of the video information content of the video frame at the multimedia server; and using upstream and downstream information theoretic measurements for the same video frame to compute the quality metric.

17. A data processing system according to claim 15, wherein the operation of using the information theoretic measurement to compute the quality measurement for the multimedia content received by the client data processing system comprises:

computing the quality measurement based on factors including:

a frame loss factor.

* * * * *